US007673409B2

(12) United States Patent
Pitcher et al.

(10) Patent No.: US 7,673,409 B2
(45) Date of Patent: Mar. 9, 2010

(54) SIGN SUPPORT ARRANGEMENT

(75) Inventors: David E. Pitcher, Swampscott, MA (US); Rebecca Suciu, Lynn, MA (US); Thomas P. Burrous, Haverhill, MA (US); Alan L. Stenfors, Scituate, MA (US); Sidney Rose, Marblehead, MA (US)

(73) Assignee: Rose Displays, Ltd., Salem, MA (US)

(*) Notice: Subject to any disclaimer, the term of this patent is extended or adjusted under 35 U.S.C. 154(b) by 0 days.

(21) Appl. No.: 11/897,181

(22) Filed: Aug. 29, 2007

(65) Prior Publication Data

US 2009/0056187 A1 Mar. 5, 2009

(51) Int. Cl.

| | |
|---|---|
| ***G09F 7/22*** | (2006.01) |
| ***G09F 3/20*** | (2006.01) |
| ***G09F 7/00*** | (2006.01) |
| ***G09F 17/00*** | (2006.01) |
| ***F16L 3/00*** | (2006.01) |
| ***F16L 3/08*** | (2006.01) |
| ***A47G 1/10*** | (2006.01) |
| ***A47H 1/10*** | (2006.01) |
| ***B42F 13/00*** | (2006.01) |
| ***A47G 1/16*** | (2006.01) |

(52) U.S. Cl. ............................ 40/617; 40/658; 40/603; 40/604; 40/611.12; 248/58; 248/61; 248/63; 248/65; 248/74.2; 248/316.7; 248/317; 248/327; 248/328; 248/343; 248/489; 248/492; 248/497; 248/331

(58) Field of Classification Search .................. 40/617, 40/658, 603, 604, 611.12; 248/58, 61, 63, 248/65, 742, 316.7, 317, 327, 328, 343, 489, 248/492, 497

See application file for complete search history.

(56) References Cited

U.S. PATENT DOCUMENTS

| | | | | |
|---|---|---|---|---|
| 5,090,145 | A * | 2/1992 | Chiang et al. | 40/605 |
| 5,927,671 | A * | 7/1999 | Pynenburg | 248/451 |
| 7,086,190 | B2 * | 8/2006 | Voluckas | 40/617 |
| 7,159,347 | B1 * | 1/2007 | Ngan | 40/514 |
| 7,261,269 | B2 * | 8/2007 | Cote | 248/317 |
| 7,318,567 | B2 * | 1/2008 | Mori et al. | 248/51 |
| 2007/0209261 | A1 * | 9/2007 | Stover et al. | 40/617 |

* cited by examiner

*Primary Examiner*—Lesley Morris
*Assistant Examiner*—Syed A Islam
(74) *Attorney, Agent, or Firm*—Don Halgren

(57) ABSTRACT

A sign holder arrangement for the support of a sign from an overhead support. The holder arrangement comprises an upper sign holder assembly clamped upon an upper edge of the sign and a lower sign holder assembly clamped upon a lower edge of the sign. At least one outer support clip is disposed peripherally around the upper sign holder. The clip has a cable attached thereto and to the overhead support to hold the sign therefrom.

6 Claims, 5 Drawing Sheets

SIGN SUPPORT ARRANGEMENT

BACKGROUND OF THE INVENTION

1. Field of the Invention

The present invention relates to an elongated sign holder arrangement for grippingly and replacably supporting a sign from an overhead support or the like.

2. Prior Art

One approach for advertising wares in stores is to utilize signs printed or mounted on substrates such as paper or sheets of plastic. The advantages of such signs are their low cost, ease of shipping and their ability to be changed in a very short period of time.

The disadvantages of such signs is that unless they are properly supported, they may curl on their ends, warp, or twist, often in undesirable manners.

It is an object of the present invention to overcome the disadvantages of the prior art, and to provide a sign holder arrangement which is easily usable and changeable by the most inexperienced store personnel.

It is yet a further object of the present invention to provide a sign holder arrangement which will keep a sign in proper alignment without permitting any undesirable turns or twisting therewith.

It is another object of the present invention to provide a sign holder with strong gripping/holding power.

It is yet another object of the present invention to provide a sign holder that in its simplicity, is very aesthetically pleasing.

It is still yet another object of the present invention to provide a sign holder which neatly and easily supports and grips a sign which may be wider than the sign holder is long.

It is yet another object of the present invention to provide a sign holder which is not dependent on the surface quality of the substrate, or its rigidity (or lack thereof, excluding cloth), in order to easily close and open for the purposes of changing the sign.

It is still yet another object of the present invention to provide a sign holder which is best suited for use with all of its constituent parts, thus insuring a complete and finished display appearance.

BRIEF SUMMARY OF THE INVENTION

The present invention comprises a sign holder arrangement for suspending a sign from an overhead support such as for example, a ceiling rail or the like. The sign holder arrangement preferably comprises an elongated upper sign holder assembly encircled by one or more rigid outer support clips. Each rigid outer support clip is supported by an overhead support cable attached thereto. The upper sign holder assembly enclosingly supports a sign extending vertically downwardly therefrom.

An elongated lower sign holder assembly attaches along the lower edge of the vertically supported sign. The upper sign holder assembly and the lower sign holder assembly are effectively mirror images of one another, except that the upper sign holder assembly has at least one, but typically two or more, overhead cables extending from their respective rigid outer support clips.

Each outer support clip has an articulable inner liner arrangement fitted therewithin. Each inner liner has a first and a second side, in a generally "C"-shaped configuration. Each inner liner side is connected to its opposed liner side by an inner liner bridge. Each inner liner side is attached to the inner liner bridge by a liner living hinge. The inner liner may be folded into a somewhat oval shape with an elongated gap between the (distalmost ends of its respective side members. The inner liner slidingly mates within the rigid outer support clip in a securable support manner therewithin. The rigid outer support clip being of rigid generally oval shape has one edge portion with a sign receiving slot therealong. The other edge of the generally oval-shaped rigid outer support clip has channel running therealong. The channel is defined by an elongated flange with a gap running alongside.

A cable slot extends up one side portion of the rigid outer support clip. The cable slot permits an elongated flexible cable to be slid into that rigid outer support clip in a supportive manner. That cable has a lowermost tab thereon, which is received within the channel of the clip. The inner liner bridge member, when the liner is mated within the clip, insures that the cable tab remains within the channel of the rigid outer support clip during its use.

Each upper and lower holder assembly utilizes an inner gripper assembly. The inner gripper assembly is comprised of a pair of opposed inner frame members, each of generally "C" shape in cross-section. Each inner frame member has a plurality of spaced-apart "T"-shaped flanges extending parallel to one another within the inner frame. The inner gripper assembly also comprises a sign gripper. The sign gripper comprises a pair of elongated co-extruded side panels having a pair of "L" shaped support flanges thereon. Each "L" shaped support flange is arranged so as to slidingly engage their respectively adjacent "T" shaped flanges on their respective inner side of the frame portions. Each sign gripper panel is connected to its opposite gripper panel by a living hinge extending across a first edge thereof.

Once the sign grippers are mated within their respective side portions of their inner frames, they are articulable with respect to one another by the living hinge.

A sign may be placed upon an open inner gripper assembly, up to and along the living hinge of the sign gripper. One inner frame is then closed over the other inner frame so as to securely grip and maintain the sign between a plurality of spaced-apart, parallel, wing members extending off of the respective inner panel side members. The elongated wings are resilient so as to flexibly hold and maintain a sign therebetween.

Once a first inner frame member is folded over the other corresponding inner frame member of a sign holder assembly, it may be slid within the inner liners in one or more rigid outer support clips. Both of the upper edge of the sign and the lower edge of the sign may thus the similarly captured respectively by the upper sign holder assembly and the lower sign holder assembly. The overhead cables attached to the rigid outer support clip or clips surrounding the upper sign holder assembly may be attached in a customary manner such as an overhead inverted "T" rail or the like, for display of that sign.

The invention thus comprises a sign holder arrangement for the holding of a sign from an overhead support, comprising: an upper holder assembly clamped upon an upper edge of the sign; a lower holder assembly clamped upon a lower edge of sign; and at least one outer support clip disposed peripherally around most of the upper holder member, the clip having a cable attached thereto and to the overhead support to support the sign therefrom. The upper holder assembly may have a pair of outer support clips thereon. The outer support clip may have an articulable liner slidingly received therein, to provide snug receipt of an inner gripper assembly therein. The inner gripper assembly is preferably comprised of a pair of generally "C" shaped, elongated inner frame members. The inner frame members preferably have a plurality of "T" shaped flanges co-extruded therewith, extending off of an inner side thereof. Each of the inner frame members may have an elongated sign gripper attached thereto, each of the sign grippers having an elongated "L" shaped flange extending off of an outer side thereof for engaging the "T" shaped flanges on the inner frame members. Each of the sign grippers preferably have a plurality of elongated, flexible, co-extruded wing members extending off of a side thereof, the wing members being arranged to resiliently pinch a sign between opposed wing members when a sign is arranged therebetween. The outer support clip may have a slot on one side thereof to permit sliding entry of a tab end of the cable to be slid therein. The outer support clip preferably has an elongated channel therein on one side edge thereof, to permit the tab end of the cable to be secured therewithin.

The invention also comprises a method of supporting a sign from an overhead support, comprising one or more of the following steps: clamping an upper edge of the sign in an upper sign holder assembly; clamping a lower edge of the sign in a lower sign holder assembly; inserting a support cable into a slot on an outer support clip, inserting the upper sign holder assembly into the outer support clip; and attaching an upper end of the cable to an overhead support. The method may include: inserting the upper sign holder assembly into a second support clip, after inserting a second support cable into the second support clip.

The invention also comprises a method of supporting a sign from an overhead support, comprising one or more of the following steps including: arranging a plurality of parallel elongated articulable fin members on an elongated foldable backing panel; folding the foldable backing panel onto a display panel to as to be serpentinely squeezed therebetween; inserting the flexible backing panel into a rigid support clip so as to comprise a holder assembly; and supporting the holder assembly from the overhead support; inserting an overhead support cable into the rigid support clip before inserting the backing panel into the rigid support clip. The flexible display panel may be of a width L2 and the support assembly may have a length L1, wherein L2 is larger than L1.

The invention also includes a sign holder arrangement for supporting a sign from an overhead support, comprising: an upper frame support assembly clamped upon an upper edge of the sign; a lower frame support assembly clamped upon a lower edge of the sign; an inner foldable gripping panel having a plurality of parallel, fins articulably attached thereto, so as to compress said fins and pinch said sign therebetween, the gripping panel member being arranged in both the upper frame member and the lower frame member; at least one outer support clip disposed peripherally around most of the upper frame member, the clip having a cable attached thereto and to the overhead support to support the sign therefrom. The outer support clip preferably has a gap on one edge thereof to permit the sign to extend therebetween.

The invention also includes a sign holder assembly for supporting a sign from an overhead member, comprising an elongated, articulable, sign-clamping upper sign holder, an elongated, articulable, sign-clamping lower sign holder, an upper sign holder clamp to maintain the upper sign holder clamped about a sign therewithin, a lower-sign holder clamp to maintain the lower sign holder clamped about a sign therewithin, and a connector arranged between the upper sign holder clamp and the overhead member for supporting the sign holder assembly therefrom. The upper sign holder and the lower sign holder are preferably structurally equal. The lower sign holder may be of a length which is shorter than the sign having a width, is wide.

DESCRIPTION OF THE DRAWINGS

The objects and advantages of the present invention will become more apparent when viewed in conjunction with the following drawings in which.

DETAILED DESCRIPTION OF THE PREFERRED EMBODIMENTS

Figure 1:
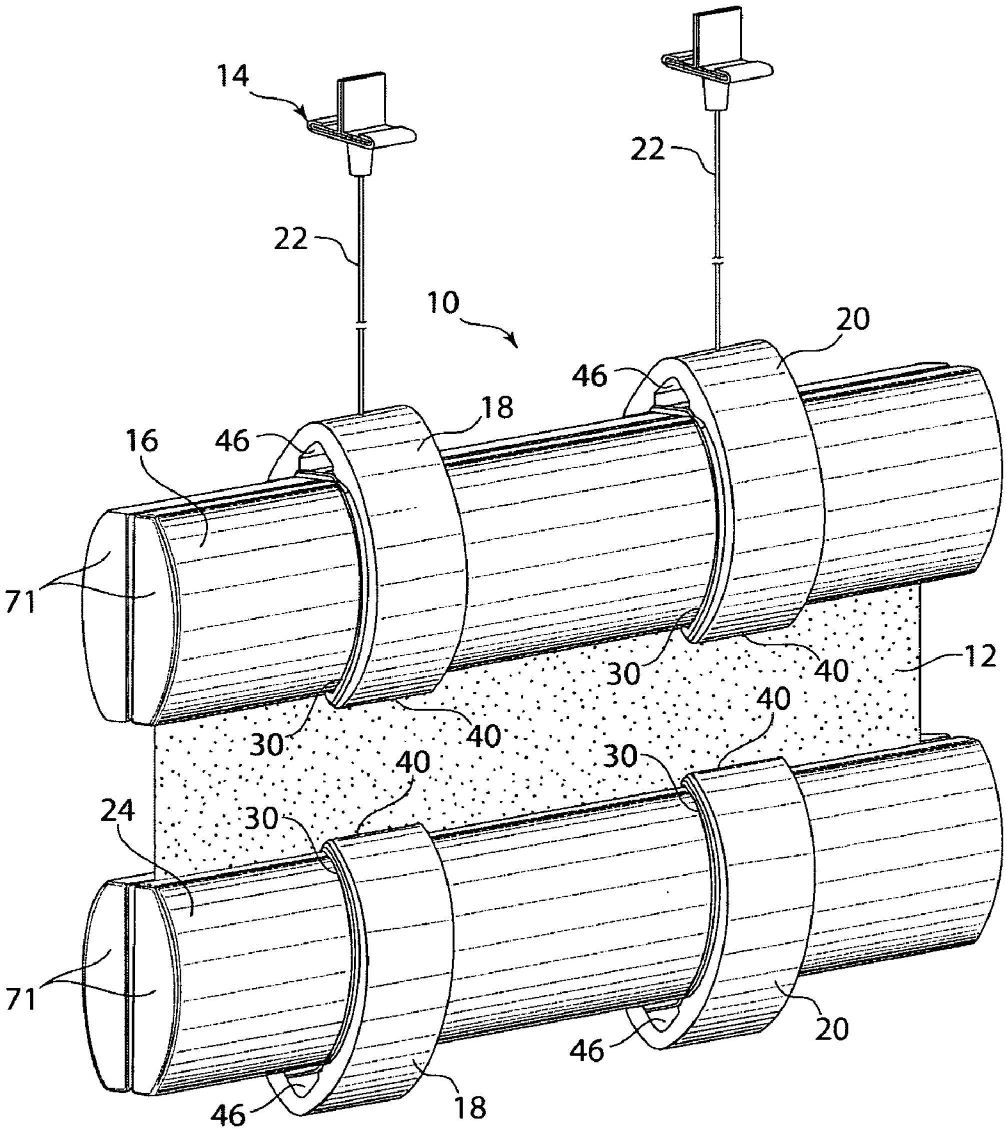
FIG. 1 is a perspective view of a sign holder arrangement showing an upper sign holder assembly and a lower sign holder assembly with a sign configured therebetween.

Referring to the drawings in detail, and particularly to FIG. 1, there is shown the present invention which comprises a sign holder arrangement 10 for supporting a sign 12 from an overhead support 14 such as for example, a ceiling rail or the like. The sign holder arrangement 10 preferably comprises an elongated upper sign holder assembly 16 encircled by one or more rigid outer support clips 18 and 20. Each rigid outer support clip 18 and 20 (on the upper sign holder assembly 16) is supported by an overhead support cable 22 attached thereto. The upper sign holder assembly 16 enclosingly supports the sign 12 extending vertically downwardly therefrom.

An elongated lower sign holder assembly 24 attaches along the lower edge of the vertically supported sign 12. The upper sign holder assembly 16 and the lower sign support assembly 24 are effectively mirror images of one another, except that the upper sign support assembly 16 has one or more overhead cables 22 extending from their respective rigid outer support clips 18 and/or 20.

Figure 2:
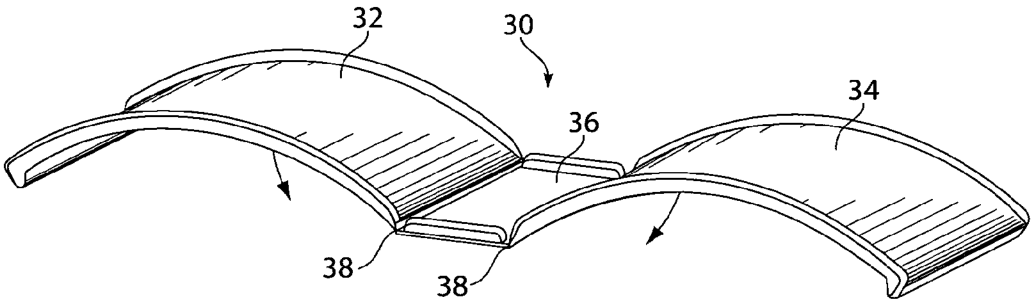
FIG. 2 is a perspective view of an inner liner fully opened, which inner liner mates, once folded-up, with an outer support clip.
Figure 3:
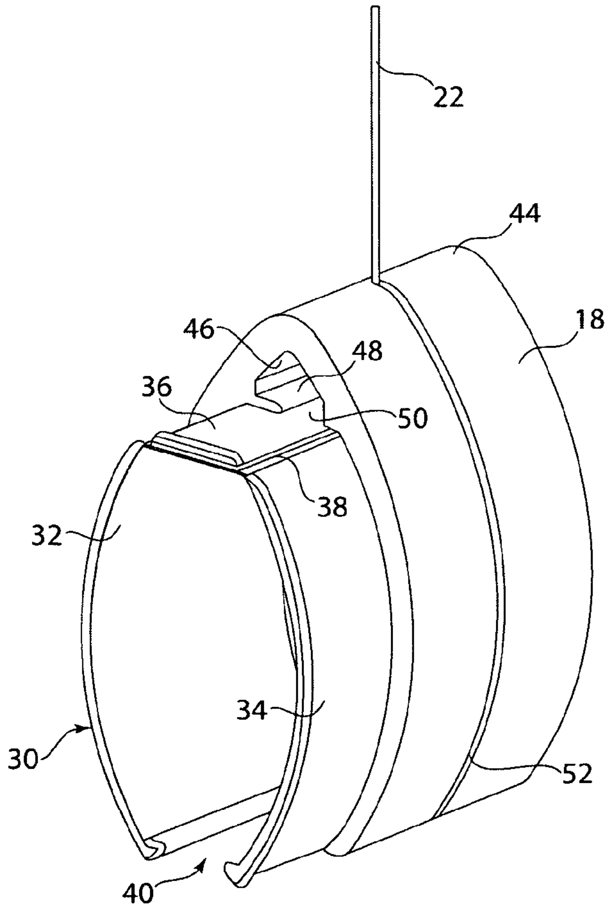
FIG. 3 is a perspective view showing an outer support clip with an inner liner being slid therewithin.

Each outer support clip 18 and/or 20 has articulable inner liner arrangement 30 fitted therewithin, as may be seen in FIG. 1, and shown more clearly in FIG. 2. Each inner liner arrangement 30, has a first and a second curved side 32 and 34, which have a generally "C"-shaped configuration as is shown in FIG. 2. Each inner liner side 32 and 34 is connected to its opposed liner side by an inner liner bridge 36. Each inner liner side 32 and 34 is respectively attached to the inner liner bridge 36 by a liner living hinge 38. The inner liner 30 may be folded into a somewhat oval shape with an elongated gap 40 between the distalmost ends of its respective side 32 and 34, as represented in FIG. 3. The inner liner 30 slidingly mates within the rigid outer support clip 18 in a securable support manner therewithin, as represented in FIG. 3. The rigid outer support clip 18 (or 20) being of rigid generally oval shape has one edge portion with a sign receiving slot 42 therealong. The other edge 44 of the generally oval-shaped rigid outer support clip 18 (or 20) has channel 46 running therewithin. The channel 46 is defined by an elongated flange 48 with a gap 50 running alongside, as best shown in FIG. 3.

Figure 7:
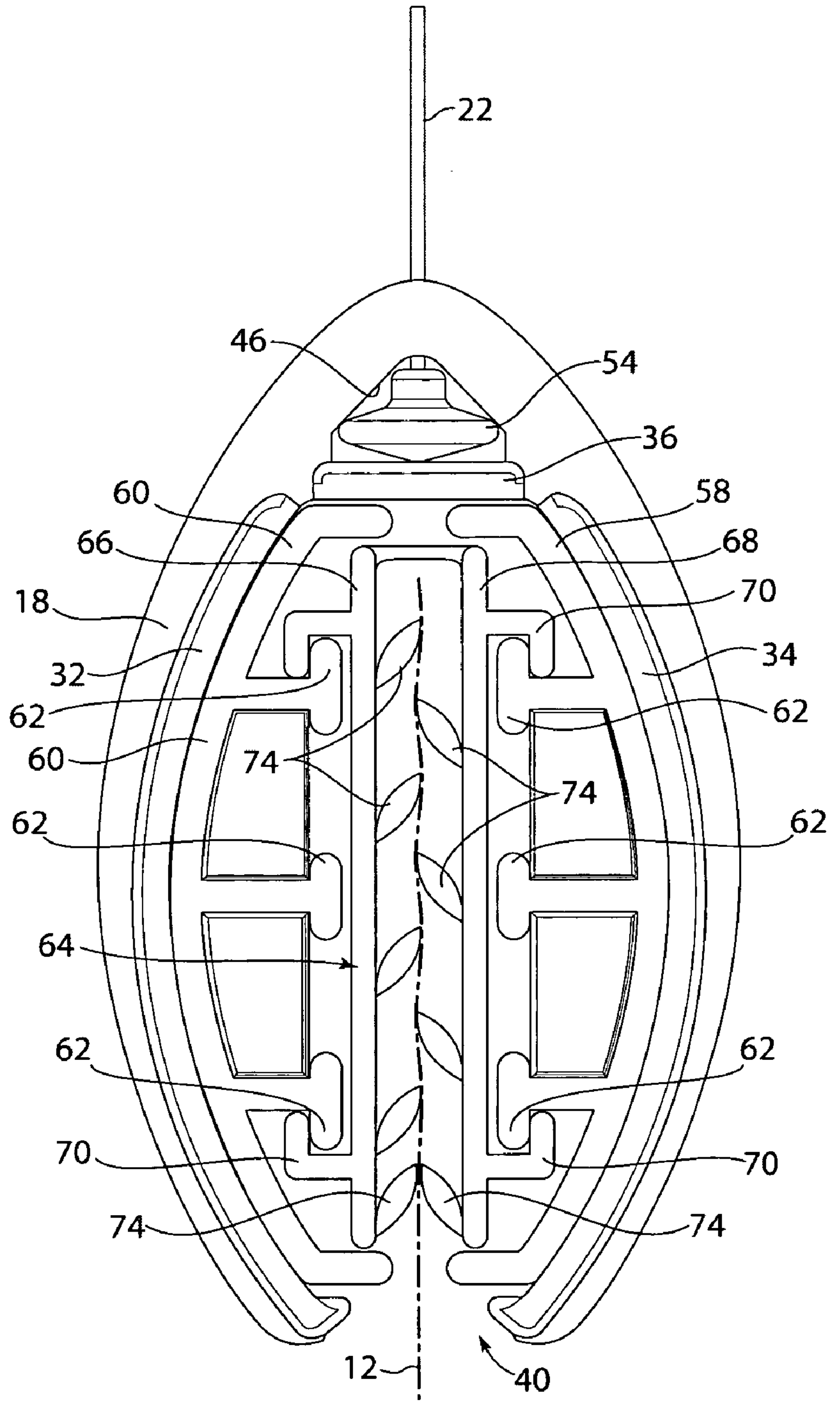
FIG. 7 is an end view of an upper sign holder assembly with its support cable, its inner liner, its inner frame and its sign gripper holding a sign therewithin.

A cable slot 52, shown in FIG. 3, extends up one side portion of the rigid outer support clip 18. The cable slot 52 permits an elongated flexible cable 22 to be slid into that rigid outer support clip 18 in a supportive manner. That cable 22 has a lowermost tab 54 thereon, which is received within the channel 46 of the clip. 18, as best represented in FIG. 7. The inner liner bridge member 36, when the liner 30 is mated within the clip 18, insures that the cable tab 54 remains within the channel 46 of the rigid outer support clip 18 (or 20) during its use.

Figure 4:
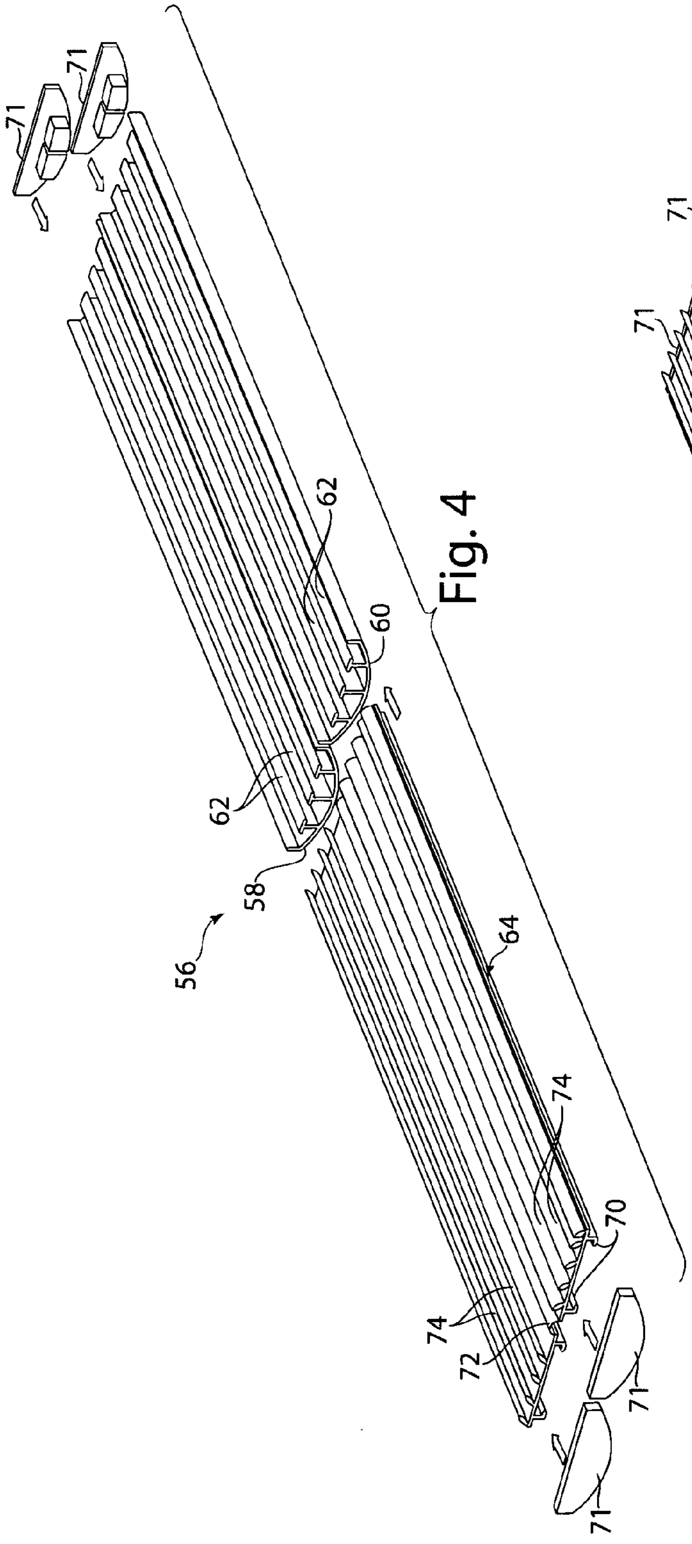
FIG. 4 is an exploded view of an inner gripper assembly which comprises an inner frame and a sign gripper in their pre-interlocking mode.
Figure 5:
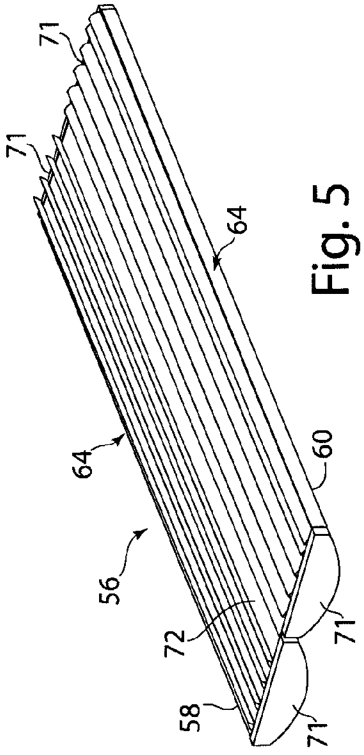
FIG. 5 is a perspective view of the inner frame and the sign gripper of FIG. 4, shown assembled.

Each upper and lower holder assembly 16 and 24 is comprised of an inner gripper assembly 56, as represented in FIGS. 4 and 5. The inner gripper assembly 56 is comprised of a pair of opposed inner frame members 58 and 60, each of generally "C" shape in cross-section, as represented in FIGS. 4 and 7. Each inner frame member 58 and 60 has a plurality of spaced-apart "T"-shaped flanges 62 extending parallel to one another within their respective inner frame 58 or 60, as represented in FIGS. 4 and 7. The inner gripper assembly 56 also comprises a sign gripper 64. The sign gripper 64 comprises a pair of elongated co-extruded side panels 66 and 68 each having a pair of "L" shaped support flanges 70 thereon, best represented in FIGS. 4 and 7. Each "L" shaped support flange 70 is arranged so as to slidingly and supportively engage their respectively adjacent "T" shaped flanges 62 on their respective inner side of the inner frame members 58 and 60. Each sign gripper panel 66 and 68 is connected to its opposite gripper panel 68 and 66 by a living hinge 72 extending across a first edge thereof, as shown in FIGS. 4, 5, 6 and 7.

Figure 6:
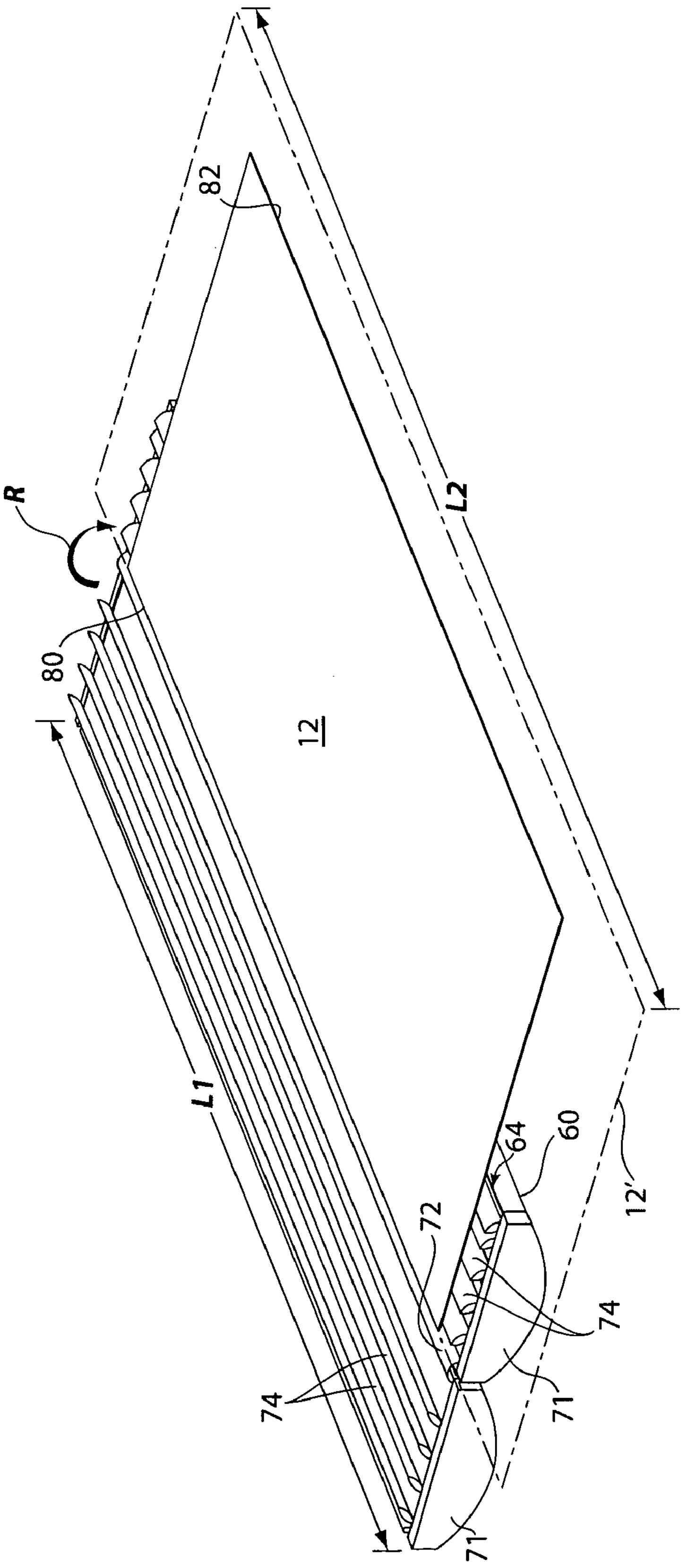
FIG. 6 is a perspective view of the inner gripper assembly shown in FIG. 5 with a sign being placed along one of the sign grippers, prior to the sign grippers being folded against one another.

Once the sign grippers 64' are mated within their respective side portions 66 and 68 of their inner frames 58 and 60, as shown in FIGS. 5 and 6, they are articulable with respect to one another about the living hinge 72, as represented by arrow "R" shown in FIG. 6. End caps 71, shown in FIG. 4 in a pre-attached viewing, are permanently secured to the respective ends of the frames 58 and 60, as represented in FIG. 5.

A sign 12 may be placed upon an open inner gripper assembly 56, up to and along the living hinge 72 of the sign holder 56, as shown in FIG. 6. One inner frame 58 is then closed over the other inner frame 60 so as to securely grip and maintain the sign 12 between a plurality of spaced-apart, parallel, wing members or "fins" 74, co-extruded with and flexible, extending off of the respective inner panel side members 66 and 68. The elongated wings or fins 74 are resilient so as to flexibly and firmly hold and strongly maintain a sign 12 therebetween, as represented in FIGS. 1 and 7.

Once a first inner frame member i.e 58, is folded over the other corresponding inner frame member 60 of a sign holder assembly 56, it may be slid within one or more rigid outer support clips 18 and 20, which have their inner liners 30 in place, as represented in FIG. 1. Both of the upper edge of the sign 80 and the lower edge 82 of the sign 12 may thus be similarly captured respectively by the upper sign holder assembly 16 and the lower holder assembly 24. The overhead cables 22 attached to the rigid outer support clips 18 and 20 surrounding the upper sign holder assembly 16 may be attached in a customary manner such as an overhead inverted "T" rail 14 or the like for display of that sign 12, as shown in FIG. 1.

It is to be noted that a sign or poster 12', as partially represented in phantom in FIG. 6, could be wider than the frame members 58 and 60 are long, while still providing strong lateral support and gripping power due to the fins 74 compressing against the sides of sign 12 when the sign is pinched between the fins 74, as represented in FIG. 7. For example, the frame members 58 and 60, and the sign holder 64 and fins 74 for example, preferably have a generally common length L1, and the sign 12' may have a length L2, wherein length L2 is longer than length L1, as represented in FIG. 6.

Thus, the present invention provides a simple, closable support assembly for a sign 12 which omits the need for springs, cams, pressure fits or other intricate mechanisms typically associated with the prior art. The holding power of this support arrangement 10 accommodates almost any kind of sign substrate 12, even if for example, such a sign 12' is larger (wider) than the support assembly 16 is long.

We claim:

1. A sign holder arrangement for the straight, planar support of a sign from an overhead support, comprising: an upper sign holder assembly clamped upon an upper edge of said sign; a lower sign holder assembly clamped upon a lower edge of said sign; and at least one outer support clip disposed peripherally around said upper sign holder, said clip having a cable attached thereto and to said overhead support to support said sign therefrom, wherein said outer support clip has an articulable liner slidingly received therein, to provide snug receipt of an inner gripper assembly therein, and wherein said inner gripper assembly is comprised of a pair of generally "C" shaped, elongated inner frame members, wherein said inner frame members have a plurality of "T" shaped flanges co-extruded therewith, extending off of an inner side thereof, and wherein each of said inner frame members have an elongated sign gripper attached thereto, each of said sign grippers having an elongated "L" shaped flange extending off of an outer side thereof for engaging said "T" shaped flanges on said inner frame members, and wherein each of said sign grippers have a plurality of elongated, flexible, co-extruded fins extending off of a side thereof, said fins arranged to resiliently pinch a sign between opposed fins when a sign is arranged therebetween.

2. The sign holder arrangement as recited in claim 1, wherein said upper sign holder assembly has a pair of outer support clips thereon.

3. The sign holder arrangement as recited in claim 1, wherein said outer support clip has a slot on one side thereof to permit sliding entry of a tab of said cable therein.

4. The sign holder arrangement as recited in claim 3, wherein said outer support clip has an elongated channel therein on one side edge thereof, to permit said tab of said cable to secured therewithin.

5. A method of supporting a sign, by a sign holder arrangement as recited in claim 1, from an overhead support, comprising:

clamping the upper edge of said sign in the upper sign holder assembly;

clamping the lower edge of said sign in the lower sign holder assembly;

inserting the support cable into a slot on an outer support clip to be arranged about said upper sign holder;

inserting said upper sign holder assembly into said outer support clip; and attaching an upper end of said cable and hence said sign holder assembly, to the overhead support.

6. The method as recited in claim 5, including:

inserting said upper sign holder assembly into a second support clip, after inserting a second support cable into said second support clip.

* * * * *